(12) United States Patent
Huddleston et al.

(10) Patent No.: US 9,878,467 B2
(45) Date of Patent: Jan. 30, 2018

(54) APPARATUS AND PROCESS FOR FORMING PARTICLES

(71) Applicant: The Procter & Gamble Company, Cincinnati, OH (US)

(72) Inventors: Richard Albert Huddleston, Cincinnati, OH (US); Lisa Grace Frentzel, Cincinnati, OH (US); Robert Richard Dykstra, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 171 days.

(21) Appl. No.: 14/744,494

(22) Filed: Jun. 19, 2015

(65) Prior Publication Data
US 2016/0368169 A1    Dec. 22, 2016

(51) Int. Cl.
| B01J 2/04 | (2006.01) |
| B29B 13/00 | (2006.01) |
| B01J 2/26 | (2006.01) |
| B29K 71/00 | (2006.01) |
| B29L 31/00 | (2006.01) |

(52) U.S. Cl.
CPC ............. B29B 13/00 (2013.01); B01J 2/04 (2013.01); B01J 2/26 (2013.01); B29K 2071/00 (2013.01); B29L 2031/00 (2013.01)

(58) Field of Classification Search
CPC .... B01J 2/04; B01J 2/26; B29B 13/00; B29K 2071/00
USPC ........................ 512/4; 510/441, 451; 427/212
See application file for complete search history.

(56) References Cited

U.S. PATENT DOCUMENTS

| 3,433,859 | A | | 3/1969 | Ban |
| 3,598,373 | A | | 8/1971 | Inman |
| 4,209,417 | A | | 6/1980 | Whyte |
| 4,234,627 | A | | 11/1980 | Schilling et al. |
| 5,013,498 | A | | 5/1991 | Froeschke |
| 6,979,663 | B2 | * | 12/2005 | Wolfe ................ B01J 33/00 264/13 |
| 7,056,877 | B2 | | 6/2006 | Caswell et al. |
| 7,091,171 | B2 | | 8/2006 | Caswell et al. |
| 7,166,565 | B2 | | 1/2007 | Caswell et al. |
| 7,186,680 | B2 | | 3/2007 | Caswell et al. |
| 7,494,965 | B2 | | 2/2009 | Caswell et al. |
| 7,534,578 | B1 | | 5/2009 | Caswell et al. |
| 7,544,651 | B2 | | 6/2009 | Caswell et al. |
| 7,786,027 | B2 | | 8/2010 | Aouad et al. |
| 7,867,968 | B1 | | 1/2011 | Aouad |
| 7,871,976 | B1 | | 1/2011 | Aouad |
| 8,476,219 | B2 | | 7/2013 | Aouad |
| 9,453,188 | B2 | * | 9/2016 | Brown ................ C11D 3/3707 |
| 9,545,460 | B2 | * | 1/2017 | Frentzel ................ A61L 9/02 |
| 9,714,401 | B2 | * | 7/2017 | Frankenbach ....... C11D 3/0068 |
| 9,763,860 | B2 | * | 9/2017 | Sodd ........................ A61K 8/11 |
| 2003/0104969 | A1 | | 6/2003 | Caswell et al. |
| 2006/0023556 | A1 | | 6/2006 | Caswell et al. |
| 2007/0269651 | A1 | | 11/2007 | Denome et al. |
| 2008/0014393 | A1 | | 1/2008 | Denome et al. |
| 2008/0131695 | A1 | | 6/2008 | Aouad et al. |
| 2009/0215664 | A1 | * | 8/2009 | Raehse ................... C11D 1/75 510/276 |
| 2010/0035789 | A1 | | 2/2010 | Caswell et al. |
| 2010/0115708 | A1 | | 5/2010 | Caswell et al. |
| 2010/0249014 | A1 | | 9/2010 | Denome et al. |
| 2010/0298191 | A1 | | 11/2010 | Denome et al. |
| 2012/0231277 | A1 | * | 9/2012 | Roos .................... B01J 2/006 428/403 |
| 2012/0270765 | A1 | * | 10/2012 | Aouad ................. C11D 3/3707 512/4 |
| 2013/0112370 | A1 | | 5/2013 | Schromm et al. |
| 2013/0267454 | A1 | | 10/2013 | Aouad |
| 2014/0057825 | A1 | * | 2/2014 | Denome .............. A61K 8/0208 510/439 |
| 2014/0179587 | A1 | | 6/2014 | Brown et al. |
| 2016/0121286 | A1 | | 5/2016 | Sodd et al. |
| 2016/0369211 | A1 | * | 12/2016 | Dykstra ................. C11L 39/00 |

FOREIGN PATENT DOCUMENTS

| WO | WO 2004/20566 A1 | 3/2004 |
| WO | WO 2009/047126 A2 | 4/2009 |
| WO | WO 2009/047127 A1 | 4/2009 |
| WO | WO 2014099879 A1 * | 6/2014 ........... C11D 3/3707 |

OTHER PUBLICATIONS

Sandvik Rotoform Process, New performance standards in premium pastillation, pp. 1-16, Jun. 2011.*
Consumer Energy Center, California Energy Commission, "Residential Clothes Washers", 2 pages, obtained Jun. 22, 2015 at: http://www.consumerenergycenter.org/residential/appliances/washers.html.
Non-Final Office Action for U.S. Appl. No. 14/071,024, dated Apr. 24, 2015, 14 pages.
Non-Final Office Action for U.S. Appl. No. 13/462,157, dated Nov. 20, 2012, 11 pages.
Notice of Allowance for U.S. Appl. No. 13/462,157, dated Mar. 26, 2013, 9 pages.
Non-Final Office Action for U.S. Appl. No. 13/908,514, dated Jan. 27, 2015, 15 pages.
Final Office Action for U.S. Appl. No. 13/908,514, dated Jul. 2, 2015, 18 pages.
International Search Report for International Application Serial No. PCT/US2016/037972, dated Sep. 16, 2016, 10 pages.
Non-Final Office Action for U.S. Appl. No. 13/908,514, dated Dec. 8, 2015, 17 pages.
Final Office Action for U.S. Appl. No. 13/908,514, dated May 17, 2016, 19 pages.

(Continued)

*Primary Examiner* — Douglas McGinty
(74) *Attorney, Agent, or Firm* — Gary J. Foose

(57) ABSTRACT

An apparatus and process for forming particles.

14 Claims, 5 Drawing Sheets

(56) References Cited

OTHER PUBLICATIONS

Final Office Action for U.S. Appl. No. 14/071,024, dated Mar. 18, 2016, 14 pages.
Final Office Action for U.S. Appl. No. 14/071,024, dated Aug. 12, 2016, 17 pages.
Non-Final Office Action for U.S. Appl. No. 14/532,497, dated May 19, 2016, 7 pages.
U.S. Appl. No. 14/532,497, dated Nov. 4, 2014, Sodd et al.
U.S. Appl. No. 14/744,518, dated Jun. 19, 2015, Dykstra et al.

* cited by examiner

_US 9,878,467 B2_

APPARATUS AND PROCESS FOR FORMING PARTICLES

FIELD OF THE INVENTION

Apparatus and process for forming particles.

BACKGROUND OF THE INVENTION

There are a variety of approaches for forming particles from flowable masses. Often the flowable mass is a melt. Melts are commonly prepared by providing one or more raw materials in a molten form into a batch mixer. The mixer is sized and dimensioned to provide for a desired residence time for the raw material or materials in the mixer to sufficiently mix and/or react the raw material or materials and provide a uniform temperature to the melt. After exiting the batch mixer, the melt can optionally be passed through one or more filters to remove deleterious matter. The melt is then fed into a feed pump that moves the melt via a feed pipe from the feed pump to the apparatus that dispenses the melt to form particles.

There are a variety of uses for particles and the utility of particles for such uses can depend on the unit weight of the particles. For instance, in some uses it can be desirable for the particles to able to be suspended in a liquid. In other uses, it can be desirable for particles that sink in a liquid. Still in other uses, it can be desirable for particles to float in a liquid.

With these limitations in mind, there is a continuing unaddressed need for an apparatus and process for forming particles that provides for the ability to manufacture particles having a desired unit weight.

SUMMARY OF THE INVENTION

A process for forming particles comprising the steps of: providing a precursor material to a feed pipe; entraining a gas into the precursor material; providing a distributor comprising a plurality of apertures; transporting the precursor material from the feed pipe to the distributor; passing the precursor material through the apertures; providing a moveable conveyor beneath the apertures; depositing the precursor material onto the moveable conveyor; and cooling the precursor material to form a plurality of particles.

An apparatus for forming particles, the apparatus comprising: a feed pipe; a gas feed line mounted in fluid communication with the feed pipe downstream of the batch mixer; a mill downstream of the gas feed line and in line with the feed pipe; a distributor downstream of the mill and in fluid communication with the feed pipe, wherein the distributor comprises a plurality of apertures; and a conveyor beneath the cylinder and movable in translation relative to the distributor.

A process for forming particles comprising the steps of: providing a precursor material in a batch mixer in fluid communication with a feed pipe; providing the precursor material to the feed pipe from the batch mixer; entraining gas into the precursor material; providing a distributor comprising a plurality of apertures; transporting the precursor material from the feed pipe to the distributor; passing the precursor material through the apertures; providing a moveable conveyor beneath the apertures; depositing the precursor material onto the moveable conveyor; and cooling the precursor material to form a plurality of particles.

DETAILED DESCRIPTION OF THE INVENTION

Figure 1:
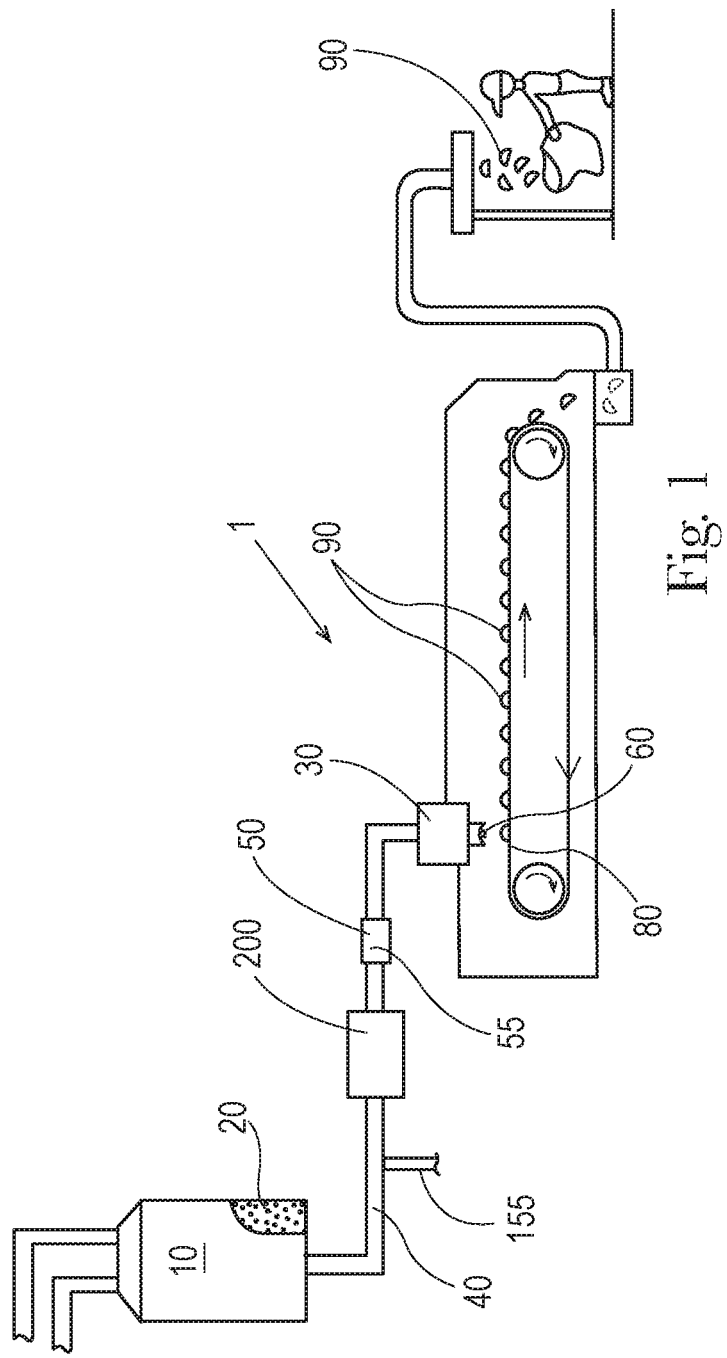
FIG. 1 is an apparatus for forming particles.

An apparatus 1 for forming particles is shown in FIG. 1. The raw material or raw materials can be provided to a batch mixer 10. The batch mixer 10 can have sufficient capacity to retain the volume of raw materials provided thereto for a sufficient residence time to permit the desired level of mixing and or reaction of the raw materials. The material leaving the batch mixer 10 can be the precursor material 20. Optionally, the precursor material can be provided to the feed pipe 40 from some other upstream mixing process, for example in-line mixing, in-line static mixing, and the like. The precursor material 20 can be a molten product. The batch mixer 10 can be a dynamic mixer. A dynamic mixer is a mixer to which energy is applied to mix the contents in the mixer. The batch mixer 10 can comprise one or more impellers to mix the contents in the batch mixer 10.

Between the batch mixer 10, which is optionally present, and the distributor 30, the precursor material 20 can be transported through the feed pipe 40. The feed pipe 40 can be in fluid communication with the batch mixer 10. A gas feed line 155 can be provided in fluid communication with the feed pipe 40 downstream of the batch mixer 10. A gas feed line 155 can be provided in fluid communication with the feed pipe 40 between the batch mixer 10 and the distributor 30. A mill 200 can be provided downstream of the gas feed line 155 and in line with the feed pipe 40. The mill 200 can be provided in line with the feed pipe 40 downstream of the gas feed line 155 and upstream of the distributor 30.

The precursor material 20 can be provided to the feed pipe 40. The feed pipe 40 is the conveyance by which the precursor material 20 is carried. The feed pipe 40 includes the conveyance between elements of the apparatus 1 and the conveyance through which the precursor material is carried within components of the apparatus 1. For instance, the mill 200 may be provided in a unit with a portion of the conveyance approaching the mill 200 and a portion of the conveyance exiting the mill 200. Each of these portions is part of the feed pipe 40. So, the feed pipe 40 can be viewed the entire conveyance between the batch mixer 10 and the distributor 30 and the feed pipe 40 is interrupted by various elements such as the gas feed line 155, the mill 200, intermediate mixer 50, and feed pump 140. In absence of a batch mixer 10 upstream of the feed pipe 40, the feed pipe 40 can be viewed the entire conveyance upstream of the distributor 30 and the feed pipe 40 is interrupted by various elements such as the gas feed line 155, the mill 200, intermediate mixer 50, and feed pump 140.

An intermediate mixer 55 can provided downstream of the mill 200 and in line with feed pipe 40. The intermediate mixer 55 can be a static mixer 50 in The intermediate mixer 55 can be in fluid communication with the feed pipe 40 between the mill 200 and the distributor 30. The intermediate mixer 55, which can be a static mixer 50, can be downstream of the batch mixer 10. Stated otherwise, the batch mixer 10 can be upstream of the intermediate mixer 55 or static mixer 55 if employed. The intermediate mixer 55 can be in-line with the feed pipe 40. The intermediate mixer 55 can be a rotor-stator mixer. The intermediate mixer 55 can be a colloid mill. The intermediate mixer 55 can be a driven in-line fluid disperser. The intermediate mixer 55 can be an Ultra Turrax disperser, Dispax-reactor disperser, Colloid Mil MK, or Cone Mill MKO, available from IKA, Wilmington, N.C., United States of America. The intermediate mixer 55 can be a perforated disc mill, toothed colloid mill, or DIL Inline Homogenizer, available from FrymaKoruma, Rheinfelden, Switzerland. The static mixer 50 can be a helical static mixer. The static mixer 50 can be a Kenics 1.905 cm inside diameter KMS 6, available from Chemineer, Dayton, Ohio, USA.

Without being bound by theory, it is believed that an intermediate mixer 55, such as the static mixer 50, can provide for a more uniform temperature of the precursor material 20 within the distributor 30 or stator 100. At the downstream end of the intermediate mixer 55, or static mixer 50 if used, the temperature of the precursor material 20 within the feed pipe 40 across a cross section of the feed pipe 40 can vary by less than about 10° C., or less than about 5° C., or less than about 1° C., or less than about 0.5° C.

In absence of a static mixer 50, the temperature across a cross section of the feed pipe 40 may be non-uniform. The temperature of the precursor material 20 at the center line of the feed pipe 40 may be higher than the temperature of the precursor feed material 20 at the peripheral wall of the feed pipe 40. When the precursor material 20 is discharged to the distributor 30 or stator 100, the temperature of the precursor material 20 may vary at different positions within the distributor or stator 100. Without being bound by theory, it is thought that by providing for a uniform temperature across the cross section of the feed pipe 40 by employing a static mixer 40 as described herein, more uniform particles 90 can be produced as compared to an apparatus 1 that does not have a static mixer 40.

The distributor 30 can be provided with a plurality of apertures 60. The precursor material 20 can be passed through the apertures 60. After passing through the apertures 60, the precursor material 20 can be deposited on a moving conveyor 80 that is provided beneath the distributor 30. The precursor material 20 can be deposited on the moving conveyor 80 when the conveyor 80 is in motion. The conveyor 80 can be moveable in translation relative to the distributor 30. The conveyor 80 can be a continuously moving conveyor 80. The conveyor 80 can be an intermittently moving conveyor 80. A continuously moving conveyor 80 may provide for higher processing speeds. An intermittently moving conveyor 80 can provide for improved control of the shape of the particles 90 that are produced.

The precursor material 20 can be cooled on the moving conveyor 80 to form a plurality of solid particles 90. The cooling can be provided by ambient cooling. Optionally the cooling can be provided by spraying the under-side of the conveyor 80 with ambient temperature water or chilled water.

Once the particles 90 are sufficiently coherent, the particles 90 can be transferred from the conveyor 80 to processing equipment downstream of the conveyor 80 for further processing and or packaging.

Figure 2:
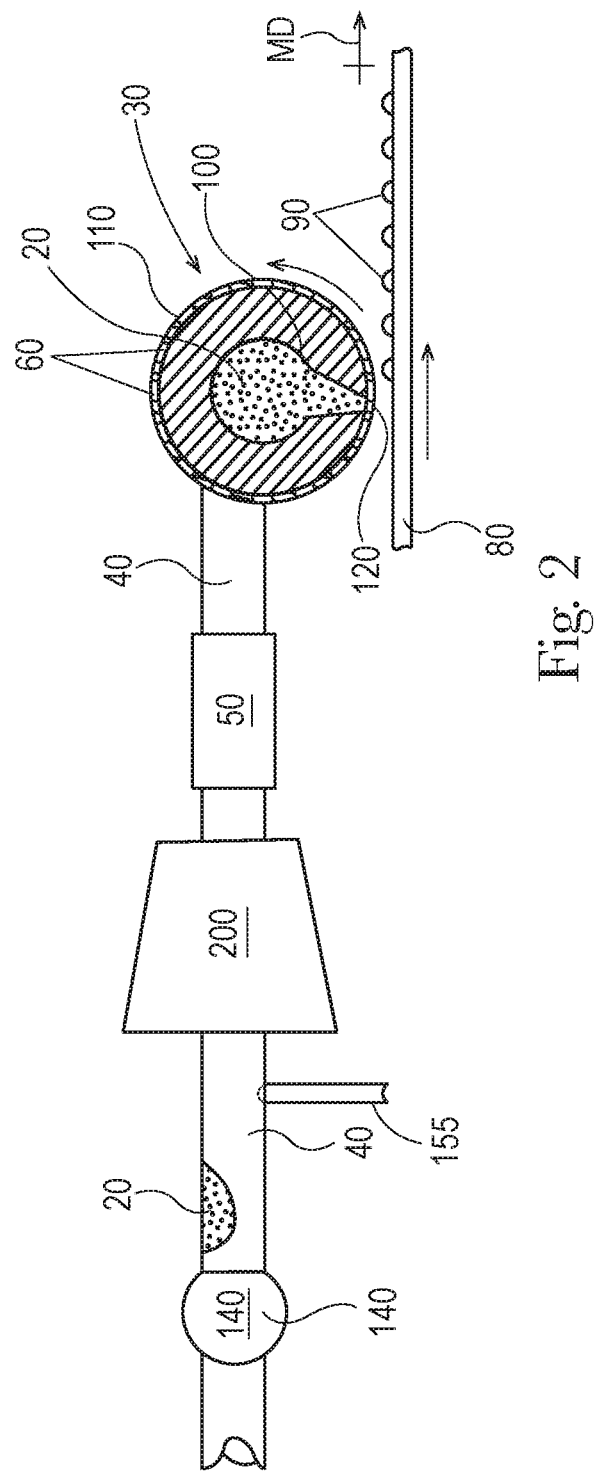
FIG. 2 is a portion of an apparatus.
Figure 3:
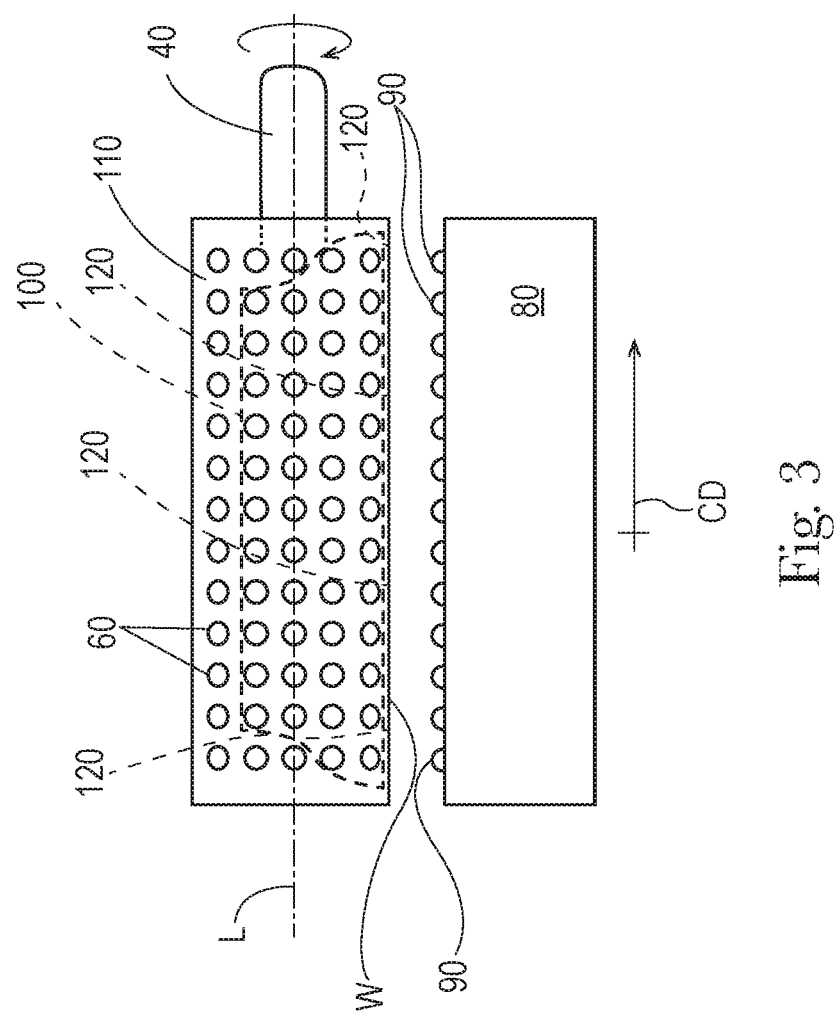
FIG. 3 is an end view an apparatus.

The distributor 30 can be a cylinder 110 rotationally mounted about a stator 100 with the stator being in fluid communication with the feed pipe 40 and the cylinder 110 can have a periphery 120 and there can be a plurality of apertures 60 in the periphery 120, as shown in FIG. 2. So, the apparatus 1 can comprise a stator 100 in fluid communication with the feed pipe 40. The feed pipe 40 can feed the precursor material 20 to the stator 100 after the precursor material 20 has passed through the mill 200.

The apparatus 1 can comprise a cylinder 110 rotationally mounted about the stator 100. The stator 100 is fed precursor material through one or both ends 130 of the cylinder 110. The cylinder 110 can have a longitudinal axis L passing through the cylinder 110 about which the cylinder 110 rotates. The cylinder 110 has a periphery 120. There can be a plurality of apertures 60 in the periphery 120 of the cylinder 110.

As the cylinder 110 is driven to rotate about its longitudinal axis L, the apertures 60 can be intermittently in fluid communication with the stator 100 as the cylinder 110 rotates about the stator 100. The cylinder 110 can be considered to have a machine direction MD in a direction of movement of the periphery 120 across the stator 100 and a cross machine direction on the periphery 120 orthogonal to the machine direction MD. The stator 100 can similarly be considered to have a cross machine direction CD parallel to the longitudinal axis L. The cross machine direction of the stator 100 can be aligned with the cross machine direction of the cylinder 110. The stator 100 can have a plurality of distribution ports 120 arranged in a cross machine direction CD of the stator 100. The distribution ports 120 are portions or zones of the stator 100 supplied with precursor material 20.

In general, precursor material 20 can fed past the gas feed line 155 through the mill 200 and feed pipe 40 to the stator 100. The stator 100 distributes the precursor feed material 20 across the operating width of the cylinder 110. As the cylinder 110 rotates about its longitudinal axis, precursor material 20 is fed through the apertures 60 as the apertures 60 pass by the stator 100. A discrete mass of precursor material 20 is fed through each aperture 60 as each aperture 60 encounters the stator 100. The mass of precursor material 20 fed through each aperture 60 as each aperture 60 passes by the stator 100 can be controlled by controlling one or both of the pressure of the precursor material within the stator 100 and the rotational velocity of the cylinder 110.

Drops of the precursor material 20 are deposited on the conveyor 80 across the operating width of the cylinder 110. The conveyor 80 can be moveable in translation relative to the longitudinal axis of the cylinder 110. The velocity of the conveyor 80 can be set relative to the tangential velocity of the cylinder 110 to control the shape that the precursor material 20 has once it is deposited on the conveyor 80. The velocity of the conveyor 80 can be the about the same as the tangential velocity of the cylinder 110.

As shown in FIG. 1, flow of the precursor material 20 through the feed pipe 40 can be provided by gravity driven flow from a batch mixer 10 and the distributor 30. To provide for more controllable manufacturing, the apparatus 1 can be provided with a feed pump 140, as shown in FIG. 2. The feed pump 140 can be in line with the feed pipe 40, with in line meaning in the line of flow of the precursor material 20. The feed pump 140 can between the batch mixer 10 and the distributor 30. The feed pump 140 can be upstream of the distributor 30. If a stator 100 is employed, the feed pump 140 can be in line with the feed pipe 40, with in line meaning in the line of flow of the precursor material 20. If a stator 100 is employed, the feed pump 140 can be between the batch mixer 10 and the stator 100. The feed pump 140 can be upstream of the stator 100. In describing the position of the feed pump 140, between is used to describe the feed pump 140 being in-line downstream of the batch mixer 10 and upstream of the distributor 30 or if used, upstream of the stator 100.

The gas feed line 155 and the mill 200 can be positioned in line between the feed pump 140 and the distributor 30 or stator 100, if employed in the apparatus 1.

The gas feed line 155 can comprise a flow regulator 158. The flow regulator 158 can regulate the flow of gas into the feed line 40. The volume of gas added per unit volume of precursor material 20 can be controlled by setting the flow regulator 158 to the desired flow. The more gas fed into the precursor material 20 within the feed line 40, the more gas that will be contained in the particles 90. The gas feed line 155 can provide for entraining gas into the precursor material 20.

The flow regulator 158 can be Key Instruments Flo-Rite Series GS 65 mm flowmeter, part number 60410-R5. The feed line 40 can be a 1½" stainless steel sanitary pipe. The gas feed line 155 can be ¼" inside diameter polyethylene tubing. Gas can be provided in the gas feed line 155 at a pressure of about 85 psi.

The flow rate of the precursor material 20 can be about 3 L/min. The precursor material 20 can be a molten material comprising any of the compositions described herein for the precursor material 20 or particles 90.

The gas provided in the gas feed line 155 can be air. Air can be practical in that it is readily available, low cost, and the chemical interactions with constituents of the particles 90 are well understood.

The gas provided in the gas feed line 155 can be an inert gas. An inert gas can be practical in that particles 90 entrained with an inert gas may be less susceptible to degradation as compared to particles 90 entrained with air.

The gas provided in the gas feed line 155 can be selected from the group consisting of air, oxygen, nitrogen, carbon dioxide, argon, and mixtures thereof. Such gasses are widely available and commonly used in commercial applications. Without being bound by theory, such gasses might improve the stability of the product.

The gas can be provided at a temperature such that when the gas reaches ambient temperature the desired volume of gas is present in the particles 90. The Ideal Gas Law can be used to determine the desired temperature of delivery. The gas can also comprise water. The water can be in gaseous or liquid form. The quantity of water in the gas can be selected to be at the desired level.

Optionally gas can be entrained in the precursor material by mixing a gas generating material in the precursor material 20.

The mill 200 can be a rotor-stator type mill. The mill can be a Quadro Z1 in-line mixer with a single stage of medium rotor stators, operated at about 400 RPM.

The mill 200 and gas feed line 155 can be combined in a single unit.

An Oakes Foamer (E.T. Oakes Corporation, 686 Old Willets Path, Hauppauge, N.Y. 11788) 2MT1A continuous foamer) can be used to provide the gas feed line 155, flow regulator 158 and mill 200 in a single unit.

A view of an apparatus 1 in the machine direction MD is shown in FIG. 3. As shown in FIG. 3, the apparatus 1 can have an operating width W and the cylinder 110 can rotate about longitudinal axis L.

The apparatus 1 for forming particles 90 can comprise: a feed pipe; a gas feed line 155 mounted in fluid communication with the feed pipe 40 downstream of the batch mixer 10; a mill 200 downstream of the gas feed line 155 and in line with the feed pipe 40; and a distributor 30 downstream of the mill 200 and fluid communication with said feed pipe 40, wherein said distributor 30 comprises a plurality of apertures 60. The apparatus 1 can comprise a conveyor beneath the distributor 30 and movable in translation relative to the distributor 30. The distributor 30 can comprise a stator 100 in fluid communication with the feed pipe 40. The distributor 30 can comprise a cylinder 110 rotationally mounted about the stator 100 and rotatable about a longitudinal axis L of the cylinder 110. The cylinder 110 can have a periphery 120 and the cylinder 110 can have a plurality of apertures 60 disposed about the periphery 120. The apertures 60 can be intermittently in fluid communication with the stator 100 as the cylinder 110 rotates about the stator 100. The apparatus can comprise a conveyor 80 beneath the cylinder 110 and the conveyor 80 can be movable in translation relative to the longitudinal axis L. The apparatus 1 for forming particles 90 can comprise a batch mixer 10. The feed pipe 40 can be in fluid communication with the batch mixer 10.

The process for forming particles 90 can comprise the steps of: providing a precursor material 20 to a feed pipe 40; providing the precursor material 20 to the feed pipe 40; entraining gas into the precursor material 20, providing a stator 100 in fluid communication with the feed pipe 40; distributing the precursor material 20 to the stator 100; providing a cylinder 110 rotating about the stator 100 and rotatable about a longitudinal axis L of the cylinder 110, wherein the cylinder 110 has a periphery 120 and a plurality of apertures 60 disposed about the periphery 120; passing the precursor material 120 through the apertures 60; providing a moving conveyor 80 beneath the cylinder 110; depositing the precursor material 20 onto the moving conveyor 80; and cooling the precursor material 20 to form a plurality of particles 90. The process can be implemented using any of the apparatuses disclosed herein. The process can employ any of the precursor materials 20 disclosed herein to form any of the particles 90 disclosed herein. The process can comprise the step of providing a precursor material 20 in a batch mixer 10 in fluid communication with the feed pipe.

The process for forming particles 90 can comprise the steps of: providing a precursor material 20 to a feed pipe 40; providing the precursor material 20 to the feed pipe 40; entraining gas into the precursor material 20; providing a distributor 30 having a plurality of apertures 60; transporting the precursor material 20 from the feed pipe 40 to the distributor 30; passing the precursor material 20 through the apertures 60; providing a moving conveyor 80 beneath the distributor 30; depositing the precursor material 20 on to the moving conveyor 80; and cooling the precursor material 20 to form a plurality of particles 90. The precursor material 20 can comprises more than about 40% by weight polyethylene glycol having a weight average molecular weight from about 2000 to about 13000 and from about 0.1% to about 20% by weight perfume. The process can be implemented using any of the apparatuses disclosed herein. The process can employ any of the precursor materials 20 disclosed herein to form any of the particles 90 disclosed herein. The process can comprise the step of providing a precursor material 20 in a batch mixer 10 in fluid communication with the feed pipe.

The precursor material 20 can be any composition that can be processed as a molten material that can be formed into the particles 90 using the apparatus 1 and method described herein. The composition of the precursor material 20 is governed by what benefits will be provided with the particles 90. The precursor material 20 can be a raw material composition, industrial composition, consumer composition, or any other composition that can advantageously be provided in a particulate form.

The precursor material 20 and particles 90 can be a fabric treatment composition. The precursor material 20 and particles 90 can comprise a carrier, perfume, and occlusions of gas. The occlusions of gas can be spherical occlusions of gas. The carrier can be or comprise a material selected from the group consisting of water soluble inorganic alkali metal salt, water-soluble alkaline earth metal salt, water-soluble organic alkali metal salt, water-soluble organic alkaline earth metal salt, water soluble carbohydrate, water-soluble silicate, water soluble urea, and any combination thereof. Alkali metal salts can be, for example, selected from the group consisting of salts of lithium, salts of sodium, and salts of potassium, and any combination thereof. Useful alkali metal salts can be, for example, selected from the group consisting of alkali metal fluorides, alkali metal chlorides, alkali metal bromides, alkali metal iodides, alkali metal sulfates, alkali metal bisulfates, alkali metal phosphates, alkali metal monohydrogen phosphates, alkali metal dihydrogen phosphates, alkali metal carbonates, alkali metal monohydrogen carbonates, alkali metal acetates, alkali metal citrates, alkali metal lactates, alkali metal pyruvates, alkali metal silicates, alkali metal ascorbates, and combinations thereof.

Alkali metal salts can be selected from the group consisting of, sodium fluoride, sodium chloride, sodium bromide, sodium iodide, sodium sulfate, sodium bisulfate, sodium phosphate, sodium monohydrogen phosphate, sodium dihydrogen phosphate, sodium carbonate, sodium hydrogen carbonate, sodium acetate, sodium citrate, sodium lactate, sodium tartrate, sodium silicate, sodium ascorbate, potassium fluoride, potassium chloride, potassium bromide, potassium iodide, potassium sulfate, potassium bisulfate, potassium phosphate, potassium monohydrogen phosphate, potassium dihydrogen phosphate, potassium carbonate, potassium monohydrogen carbonate, potassium acetate, potassium citrate, potassium lactate, potassium tartrate, potassium silicate, potassium, ascorbate, and combinations thereof. Alkaline earth metal salts can be selected from the group consisting of salts of magnesium, salts of calcium, and the like, and combinations thereof. Alkaline earth metal salts can be selected from the group consisting of alkaline metal fluorides, alkaline metal chlorides, alkaline metal bromides, alkaline metal iodides, alkaline metal sulfates, alkaline metal bisulfates, alkaline metal phosphates, alkaline metal monohydrogen phosphates, alkaline metal dihydrogen phosphates, alkaline metal carbonates, alkaline metal monohydrogen carbonates, alkaline metal acetates, alkaline metal citrates, alkaline metal lactates, alkaline metal pyruvates, alkaline metal silicates, alkaline metal ascorbates, and combinations thereof. Alkaline earth metal salts can be selected from the group consisting of magnesium fluoride, magnesium chloride, magnesium bromide, magnesium iodide, magnesium sulfate, magnesium phosphate, magnesium monohydrogen phosphate, magnesium dihydrogen phosphate, magnesium carbonate, magnesium monohydrogen carbonate, magnesium acetate, magnesium citrate, magnesium lactate, magnesium tartrate, magnesium silicate, magnesium ascorbate, calcium fluoride, calcium chloride, calcium bromide, calcium iodide, calcium sulfate, calcium phosphate, calcium monohydrogen phosphate, calcium dihydrogen phosphate, calcium carbonate, calcium monohydrogen carbonate, calcium acetate, calcium citrate, calcium lactate, calcium tartrate, calcium silicate, calcium ascorbate, and combinations thereof. Inorganic salts, such as inorganic alkali metal salts and inorganic alkaline earth metal salts, do not contain carbon. Organic salts, such as organic alkali metal salts and organic alkaline earth metal salts, contain carbon. The organic salt can be an alkali metal salt or an alkaline earth metal salt of sorbic acid (i.e., asorbate). Sorbates can be selected from the group consisting of sodium sorbate, potassium sorbate, magnesium sorbate, calcium sorbate, and combinations thereof.

The carrier can be or comprise a material selected from the group consisting of a water-soluble inorganic alkali metal salt, a water-soluble organic alkali metal salt, a water-soluble inorganic alkaline earth metal salt, a water-soluble organic alkaline earth metal salt, a water-soluble carbohydrate, a water-soluble silicate, a water-soluble urea, and combinations thereof. The carrier or water soluble-soluble carrier can be selected from the group consisting of sodium chloride, potassium chloride, calcium chloride, magnesium chloride, sodium sulfate, potassium sulfate, magnesium sulfate, sodium carbonate, potassium carbonate, sodium hydrogen carbonate, potassium hydrogen carbonate, sodium acetate, potassium acetate, sodium citrate, potassium citrate, sodium tartrate, potassium tartrate, potassium sodium tartrate, calcium lactate, water glass, sodium silicate, potassium silicate, dextrose, fructose, galactose, isoglucose, glucose, sucrose, raffinose, isomalt, xylitol, candy sugar, coarse sugar, and combinations thereof. In one embodiment, the carrier or water-soluble carrier can be sodium chloride. In one embodiment, the carrier or water-soluble carrier can be table salt.

The carrier can be or comprise a material selected from the group consisting of sodium bicarbonate, sodium sulfate, sodium carbonate, sodium formate, calcium formate, sodium chloride, sucrose, maltodextrin, corn syrup solids, corn starch, wheat starch, rice starch, potato starch, tapioca starch, clay, silicate, citric acid carboxymethyl cellulose, fatty acid, fatty alcohol, glyceryl diester of hydrogenated tallow, glycerol, and combinations thereof.

The carrier can be selected from the group consisting of water soluble organic alkali metal salt, water soluble inorganic alkaline earth metal salt, water soluble organic alkaline earth metal salt, water soluble carbohydrate, water soluble silicate, water soluble urea, starch, clay, water insoluble silicate, citric acid carboxymethyl cellulose, fatty acid, fatty alcohol, glyceryl diester of hydrogenated tallow, glycerol, polyethylene glycol, and combinations thereof.

The particles 90 can comprise from about 40% by weight to about 99% by weight of the particles 90 of the carrier. The carrier can be polyethylene glycol.

The precursor material 20, and thereby the particles 90, can comprise more than about 40% by weight polyethylene glycol having a weight average molecular weight from about 2000 to about 13000. Polyethylene glycol (PEG) has a relatively low cost, may be formed into many different shapes and sizes, minimizes unencapsulated perfume diffusion, and dissolves well in water. PEG comes in various weight average molecular weights. A suitable weight average molecular weight range of PEG includes from about 2,000 to about 13,000, from about 4,000 to about 12,000, alternatively from about 5,000 to about 11,000, alternatively from about 6,000 to about 10,000, alternatively from about 7,000 to about 9,000, alternatively combinations thereof. PEG is available from BASF, for example PLURIOL E 8000.

The precursor material 20, and thereby the particles 90, can comprise more than about 40% by weight of the particles of PEG. The precursor material 20, and thereby the particles 90, can comprise more than about 50% by weight of the particles of PEG. The precursor material 20, and thereby the particles 90, can comprise more than about 60% by weight of the particles of PEG. The precursor material 20, and thereby the particles 90, may comprise from about 65% to about 99% by weight of the composition of PEG. The precursor material 20, and thereby the particles 90, may comprise from about 40% to about 99% by weight of the composition of PEG.

Alternatively, the precursor material 20, and thereby the particles 90, can comprise from about 40% to less than about 90%, alternatively from about 45% to about 75%, alternatively from about 50% to about 70%, alternatively combinations thereof and any whole percentages or ranges of whole percentages within any of the aforementioned ranges, of PEG by weight of the precursor material 20, and thereby the particles 90.

Depending on the application, the precursor material 20, and thereby the particles 90, can comprise from about 0.5% to about 5% by weight of the particles of a balancing agent selected from the group consisting of glycerin, polypropylene glycol, isopropyl myristate, dipropylene glycol, 1,2-propanediol, and PEG having a weight average molecular weight less than 2,000, and mixtures thereof.

The precursor material 20, and thereby the particles 90, can comprise an antioxidant. The antioxidant can help to promote stability of the color and or odor of the particles over time between production and use. The precursor material 20, and thereby particles 90, can comprise between about 0.01% to about 1% by weight antioxidant. The precursor material 20, and thereby particles 90, can comprise between about 0.001% to about 2% by weight antioxidant. The precursor material 20, and thereby particles 90, can comprise between about 0.01% to about 0.1% by weight antioxidant. The antioxidant can be butylated hydroxytoluene.

In addition to the PEG in the precursor material 20, and thereby the particles 90, the precursor material 20, and thereby the particles 90, can further comprise 0.1% to about 20% by weight perfume. The perfume can be unencapsulated perfume, encapsulated perfume, perfume provided by a perfume delivery technology, or a perfume provided in some other manner. Perfumes are generally described in U.S. Pat. No. 7,186,680 at column 10, line 56, to column 25, line 22. The precursor material 20, and thereby particles 90, can comprise unencapsulated perfume and are essentially free of perfume carriers, such as a perfume microcapsules. The precursor material 20, and there by particles 90, can comprise perfume carrier materials (and perfume contained therein). Examples of perfume carrier materials are described in U.S. Pat. No. 7,186,680, column 25, line 23, to column 31, line 7. Specific examples of perfume carrier materials may include cyclodextrin and zeolites.

The precursor material 20, and thereby particles 90, can comprise about 0.1% to about 20%, alternatively about 1% to about 15%, alternatively 2% to about 10%, alternatively combinations thereof and any whole percentages within any of the aforementioned ranges, of perfume by weight of the precursor material 20 or particles 90. The precursor material 20, and thereby particles 90, can comprise from about 0.1% by weight to about 6% by weight of the precursor material 20 or particles 90 of perfume. The perfume can be unencapsulated perfume and or encapsulated perfume.

The precursor material 20, and thereby particles 90, can be free or substantially free of a perfume carrier. The precursor material 20, and thereby particles 90, may comprise about 0.1% to about 20%, alternatively about 1% to about 15%, alternatively 2% to about 10%, alternatively combinations thereof and any whole percentages within any of the aforementioned ranges, of unencapsulated perfume by weight of the precursor material 20, and thereby particles 90.

The precursor material 20, and thereby particles 90, can comprise unencapsulated perfume and perfume microcapsules. The precursor material 20, and thereby particles 90, may comprise about 0.1% to about 20%, alternatively about 1% to about 15%, alternatively from about 2% to about 10%, alternatively combinations thereof and any whole percentages or ranges of whole percentages within any of the aforementioned ranges, of the unencapsulated perfume by weight of the precursor material 20, and thereby particles 90. Such levels of unencapsulated perfume can be appropriate for any of the precursor materials 20, and thereby particles 90, disclosed herein that have unencapsulated perfume.

The precursor material 20, and thereby particles 90, can comprise unencapsulated perfume and a perfume microcapsule but be free or essentially free of other perfume carriers. The precursor material 20, and thereby particles 90, can comprise unencapsulated perfume and perfume microcapsules and be free of other perfume carriers.

The precursor material 20, and thereby particles 90, can comprise encapsulated perfume. Encapsulated perfume can be provided as plurality of perfume microcapsules. A perfume microcapsule is perfume oil enclosed within a shell. The shell can have an average shell thickness less than the maximum dimension of the perfume core. The perfume microcapsules can be friable perfume microcapsules. The perfume microcapsules can be moisture activated perfume microcapsules.

The perfume microcapsules can comprise a melamine/formaldehyde shell. Perfume microcapsules may be obtained from Appleton, Quest International, or International Flavor & Fragrances, or other suitable source. The perfume microcapsule shell can be coated with polymer to enhance the ability of the perfume microcapsule to adhere to fabric. This can be desirable if the particles 90 are designed to be a fabric treatment composition. The perfume microcapsules can be those described in U.S. Patent Pub. 2008/0305982.

The precursor material 20, and thereby particles 90, can comprise about 0.1% to about 20%, alternatively about 1% to about 15%, alternatively 2% to about 10%, alternatively combinations thereof and any whole percentages within any of the aforementioned ranges, of encapsulated perfume by weight of the precursor material 20, or particles 90.

The precursor material 20, and thereby particles 90, can comprise perfume microcapsules but be free of or essentially free of unencapsulated perfume. The precursor material 20, and thereby particles 90, may comprise about 0.1% to about 20%, alternatively about 1% to about 15%, alternatively about 2% to about 10%, alternatively combinations thereof and any whole percentages within any of the aforementioned ranges, of encapsulated perfume by weight of the precursor material 20 or particles 90.

The precursor material 20 can be prepared by providing molten PEG into a batch mixer 10. The batch mixer 10 can be heated so as to help prepare the precursor material 20 at the desired temperature. Perfume is added to the molten PEG. Dye, if present, can be added to the batch mixer 10. Other adjunct materials can be added to the precursor material 20 if desired. The precursor material 20 can optionally be prepared by in-line mixing or other known approaches for mixing materials.

If dye is employed, the precursor material 20 and particles 90 may comprise dye. The precursor material 20, and thereby particles 90, may comprise less than about 0.1%, alternatively about 0.001% to about 0.1%, alternatively about 0.01% to about 0.02%, alternatively combinations thereof and any hundredths of percent or ranges of hundredths of percent within any of the aforementioned ranges, of dye by weight of the precursor material 20 or particles 90. Examples of suitable dyes include, but are not limited to, LIQUITINT PINK AM, AQUA AS CYAN 15, and VIOLET FL, available from Milliken Chemical.

The particles 90 may have a variety of shapes. The particles 90 may be formed into different shapes include tablets, pills, spheres, and the like. A particle 90 can have a shape selected from the group consisting of spherical, hemispherical, compressed hemispherical, lentil shaped, and oblong. Lentil shaped refers to the shape of a lentil bean. Compressed hemispherical refers to a shape corresponding to a hemisphere that is at least partially flattened such that the curvature of the curved surface is less, on average, than the curvature of a hemisphere having the same radius. A compressed hemispherical particle 90 can have a ratio of height to maximum based dimension of from about 0.01 to about 0.4, alternatively from about 0.1 to about 0.4, alternatively from about 0.2 to about 0.3. Oblong shaped refers to a shape having a maximum dimension and a maximum secondary dimension orthogonal to the maximum dimension, wherein the ratio of maximum dimension to the maximum secondary dimension is greater than about 1.2. An oblong shape can have a ratio of maximum base dimension to maximum minor base dimension greater than about 1.5. An oblong shape can have a ratio of maximum base dimension to maximum minor base dimension greater than about 2. Oblong shaped particles can have a maximum base dimension from about 2 mm to about 6 mm, a maximum minor base dimension of from about 2 mm to about 6 mm.

Individual particles 90 can have a mass from about 0.1 mg to about 5 g, alternatively from about 10 mg to about 1 g, alternatively from about 10 mg to about 500 mg, alternatively from about 10 mg to about 250 mg, alternatively from about 0.95 mg to about 125 mg, alternatively combinations thereof and any whole numbers or ranges of whole numbers of mg within any of the aforementioned ranges. In a plurality of particles 90, individual particles can have a shape selected from the group consisting of spherical, hemispherical, compressed hemispherical, lentil shaped, and oblong.

An individual particle may have a volume from about 0.003 cm$^3$ to about 0.15 cm$^3$. A number of particles 90 may collectively comprise a dose for dosing to a laundry washing machine or laundry wash basin. A single dose of the particles 90 may comprise from about 1 g to about 27 g. A single dose of the particles 90 may comprise from about 5 g to about 27 g, alternatively from about 13 g to about 27 g, alternatively from about 14 g to about 20 g, alternatively from about 15 g to about 19 g, alternatively from about 18 g to about 19 g, alternatively combinations thereof and any whole numbers of grams or ranges of whole numbers of grams within any of the aforementioned ranges. The individual particles 90 forming the dose of particles 90 that can make up the dose can have a mass from about 0.95 mg to about 2 g. The plurality of particles 90 can be made up of particles having different size, shape, and/or mass. The particles 90 in a dose can have a maximum dimension less than about 1 centimeter.

Figure 4:
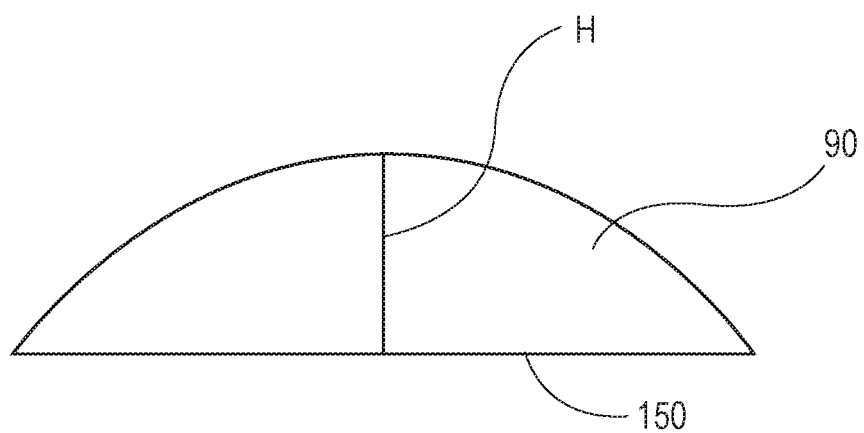
FIG. 4 is a profile view of a particle.

A particle 90 that can be manufactured as provided herein is shown in FIG. 4. FIG. 4 is a profile view of a single particle 90. The particle 90 can have a substantially flat base 150 and a height H. The height H of a particle 90 is measured as the maximum extent of the particle 90 in a direction orthogonal to the substantially flat base 150. The height H can be measured conveniently using image analysis software to analyze a profile view of the particle 90.

The process for forming particles 90 in which gas is entrained into the precursor material 20 thereby forming particles 90 have gas entrained therein can be practical for providing particles 90 that float in a liquid. Particles 90 that float in certain liquids can be practical in a variety of industrial processes and processes in the home in which particles can be used.

Particles 90 that have gas entrained therein are comprised of gas inclusions and solid and or liquid materials. Since the particles 90 have gas entrained therein, the particles 90 have a density that is less than the density of the constitutive solid and or liquid materials forming the particle 90. For instance if the particle 90 is formed of a constitutive material having a density of 1 g/cm$^3$, and the particle 90 is 10% by volume air, the density of the particle 90 is 0.90 g/cm$^3$.

For particles 90 that are used as a laundry scent additive, it can be practical that the particles 90 float in the wash solution of a laundry washing machine. Providing particles 90 that float in a the wash solution of a washing machine can provide the benefit of enhanced perfume bloom during the washing cycle as compared to particles 90 that sink and remain submerged during the washing cycle. As the particles 90 dissolve in the wash, encapsulated perfume and or unencapsulated perfume can be released from the particles 90. Perfume bloom during the washing cycle can be important to the consumer in that it promotes a more pleasant experience to the person doing the laundry and can provide a pleasant scent in the portion of the household in which laundering is conducted.

Figure 5:
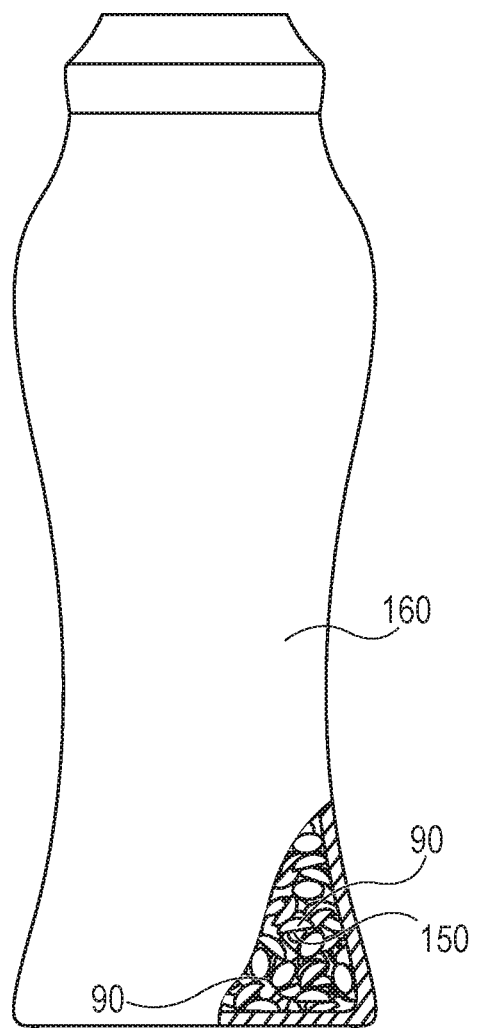
FIG. 5 is a packaged composition comprising a plurality of particles.

The particles 90 can be packaged together as a packaged composition 160 comprising a plurality of particles 90, as shown in FIG. 5. The particles can comprise a carrier, perfume, and occlusions of gas. Without being bound by theory, occlusions of gas are thought to provide for improved strength of the particles 90 as compared to particles 90 having occlusions of gas having other shapes. Spherical occlusions of gas might provide for improved strength over non-spherical occlusions of gas.

Each of the particles 90 can have a density less than about 0.95 g/cm$^3$. Since the density of a typical washing solution is about 1 g/cm$^3$, it can be desirable to provide particles 90 that have a density less than about 0.95 g/cm$^3$. By having the density less than about 0.95 g/cm$^3$, it is thought that with the typical manufacturing variability for particle making processes, that nearly all of the particles 90 produced will have a density less than about 1 g/cm$^3$. Having nearly all of the particles 90 have a density less than about 1 g/cm$^3$ can be desirable for providing for particles 90 that float in a wash liquor. The perfume bloom that can occur from a wash liquor may be greater for particles 90 that float as compared to particles 90 that sink.

Each of the particles 90 can have a mass between about 0.1 mg to about 5 g. Particles 90 can have a maximum dimension of less than about 20 mm. Particles 90 can have a maximum dimension of less than about 10 mm. Particles 90 having such a mass and maximum dimension are thought to be readily dissolvable in solutions such a wash solutions used in laundering clothing.

Each of the particles 90 can have a volume and the occlusions of gas within the particles 90 can comprise between about 0.5% to about 50% by volume of the particle 90, or even between about 1% to about 20% by volume of the particle, or even between about 2% to about 15% by volume of the particle, or event between about 4% to about 12% by volume of the particle. Without being bound by theory, it is thought that if the volume of the occlusions of gas is too great, the particles 90 may not be sufficiently strong to be packaged, shipped, stored, and used without breaking apart in an undesirable manner.

The occlusions can have an effective diameter between about 1 micron to about 2000 microns, or even between about 5 microns to about 1000 microns, or even between about 5 microns to about 200 microns, or even between about 25 to about 50 microns. In general, it is thought that smaller occlusions of gas are more desirable than larger occlusions of gas. If the effective diameter of the occlusions of gas are too large, it is thought that the particles might not be sufficiently strong to be to be packaged, shipped, stored, and used without breaking apart in an undesirable manner. The effective diameter is diameter of a sphere having the same volume as the occlusion of gas. The occlusions of gas can be spherical occlusions of gas.

Dissolving Head-Space Count testing was conducted to demonstrate the improvement in perfume bloom that can be obtained by using particles 90 that that have a density less than about 0.95 g/cm$^3$ as compared to particles 90 that sink. The Dissolving Head-Space Count testing is similar in many ways to the conditions that might occur when a consumer uses the particles to treat her laundry.

In the Dissolving Head-Space Count test method, the particles to be tested are placed in distilled water and the amount of perfume raw materials (PRM) that is transferred to the air in the head-space above the water is measured as counts at various time points. Measurement of the Dissolving Head-Space Count is conducted using a 7100 Ultra Fast GC Analyzer MicroSense5 ZNOSE with the accompanying software MicroSense version 5.37 (available from Electronic Sensor Technology, Newbury Park, Calif., USA.). This instrument system is a miniature, high-speed gas chromatograph containing a gas chromatograph sensor, pneumatic controls, and support electronics. The gas chromatograph sensor is based on a 6-port valve and oven, a pre-concentrating trap, a short gas chromatograph column and a surface acoustic wave detector. A system controller, based on a laptop computer, operates the system, analyzes the data and provides a user interface. Complete instructions for use of the ZNOSE can be found in the 7100 Ultra Fast GC Analyzer Operation Manual MicroSense 5. To conduct Dissolving Head-Space Count testing, the ZNOSE is set to the following settings: 5ps2alb_35 (DB5 column); 1 second pump sample time; 0.5 second data collection; column temperature range is 40° C. to 180° C. and ramps at a rate of 5° C./sec; and the surface acoustic wave detector is set at 35° C. A total of 20 g of 25° C. deionized (DI) water is added into a clean 40 ml sample bottle (such as VWR scientific cat. #EP 140-40C). A total of 0.040 g of the test particles or a 0.040 g portion of a test particle is added to the 20 g of water in the sample bottle, to provide a sample of the test particle material at a concentration of 2.0 mg/mL in DI water. After addition of the test particle material, a 3 mm thick PTFE silicone septum is fixed to the sample bottle and the ZNOSE inlet needle is inserted into the head-space of the sample bottle immediately, along with a separate needle attached to a carbon filter. A ZNOSE measurement is taken every 90 seconds and measurements are continued for at least 45 minutes without any agitation of the sample or bottle, at an ambient room temperature between 22° C. and 27° C. The headspace count for each PRM is recorded at each 90 second measurement time point. The Dissolving Head-Space Count reported for a given time point is the sum of the counts from all PRMs detected in the headspace at that time point.

The Dissolving Head-Space Count is a function of the concentration in the head-space of the particular perfume raw material being considered. Higher head-space counts are associated with higher concentrations of perfume in the head-space. Results were reported in headspace counts in Tables 1 and 2.

The results reported in Table 1 are the headspace counts for various perfume raw materials having particular KI values in particles in which no air was added to the precursor material. The particles 90 in which no air was added to the precursor material contained 82.8% by weight polyethylene 8000, 0.0135% by weight butylated hydroxytoluene, 1.28% by weight perfume microcapsules, 6.65% by weight neat perfume oil, 5.82% by weight dipropylene glycol, 0.0203% by weight dye, and the balance water and minors. As shown in Table 1, the headspace counts for the perfume raw materials evaluated remained zero for 1350 seconds. From 1440 seconds on, headspace counts for several perfume raw materials increased. In practical terms, what this means is that for 1350 seconds, little to no perfume from the particles dissolving in the water was transferred to the head-space above the water.

TABLE 1

Dissolving Head-Space Counts by KI value, measured every 90 seconds for particles in which no air was added to the precursor material. Particles mostly dissolved after 25 minutes (1500 seconds).

| | KI value | | | | | | | | | | | |
| --- | --- | --- | --- | --- | --- | --- | --- | --- | --- | --- | --- | --- |
| Seconds | 1024 | 1062 | 1093 | 1160 | 1254 | 1293 | 1362 | 1379 | 1426 | 1481 | 1667 | Total headspace counts |
| 0 | 0 | 0 | 0 | 0 | 0 | 0 | 0 | 0 | 0 | 0 | 0 | 0 |
| 90 | 0 | 0 | 0 | 0 | 0 | 0 | 0 | 0 | 0 | 0 | 0 | 0 |
| 180 | 0 | 0 | 0 | 0 | 0 | 0 | 0 | 0 | 0 | 0 | 0 | 0 |
| 270 | 0 | 0 | 0 | 0 | 0 | 0 | 0 | 0 | 0 | 0 | 0 | 0 |
| 360 | 0 | 0 | 0 | 0 | 0 | 0 | 0 | 0 | 0 | 0 | 0 | 0 |
| 450 | 0 | 0 | 0 | 0 | 0 | 0 | 0 | 0 | 0 | 0 | 0 | 0 |
| 540 | 0 | 0 | 0 | 0 | 0 | 0 | 0 | 0 | 0 | 0 | 0 | 0 |
| 630 | 0 | 0 | 0 | 0 | 0 | 0 | 0 | 0 | 0 | 0 | 0 | 0 |
| 720 | 0 | 0 | 0 | 0 | 0 | 0 | 0 | 0 | 0 | 0 | 0 | 0 |
| 810 | 0 | 0 | 0 | 0 | 0 | 0 | 0 | 0 | 0 | 0 | 0 | 0 |
| 900 | 0 | 0 | 0 | 0 | 0 | 0 | 0 | 0 | 0 | 0 | 0 | 0 |
| 990 | 0 | 0 | 0 | 0 | 0 | 0 | 0 | 0 | 0 | 0 | 0 | 0 |
| 1080 | 0 | 0 | 0 | 0 | 0 | 0 | 0 | 0 | 0 | 0 | 0 | 0 |
| 1170 | 0 | 0 | 0 | 0 | 0 | 0 | 0 | 0 | 0 | 0 | 0 | 0 |
| 1260 | 0 | 0 | 0 | 0 | 0 | 0 | 0 | 0 | 0 | 0 | 0 | 0 |

TABLE 1-continued

Dissolving Head-Space Counts by KI value, measured every 90 seconds
for particles in which no air was added to the precursor material.
Particles mostly dissolved after 25 minutes (1500 seconds).

| | KI value | | | | | | | | | | | Total headspace counts |
|---|---|---|---|---|---|---|---|---|---|---|---|---|
| Seconds | 1024 | 1062 | 1093 | 1160 | 1254 | 1293 | 1362 | 1379 | 1426 | 1481 | 1667 | |
| 1350 | 0 | 0 | 0 | 0 | 0 | 0 | 0 | 0 | 0 | 0 | 0 | 0 |
| 1440 | 0 | 0 | 146 | 0 | 0 | 0 | 0 | 0 | 0 | 0 | 125 | 271 |
| 1530 | 102 | 0 | 193 | 0 | 0 | 0 | 0 | 0 | 0 | 0 | 123 | 418 |
| 1620 | 230 | 0 | 372 | 0 | 0 | 139 | 0 | 0 | 0 | 0 | 148 | 889 |
| 1710 | 249 | 0 | 395 | 0 | 0 | 202 | 0 | 0 | 0 | 138 | 296 | 1280 |
| 1800 | 304 | 0 | 475 | 0 | 0 | 282 | 0 | 0 | 0 | 218 | 556 | 1835 |
| 1890 | 335 | 0 | 514 | 0 | 0 | 330 | 0 | 0 | 136 | 301 | 966 | 2582 |
| 1980 | 344 | 0 | 540 | 0 | 0 | 385 | 0 | 0 | 175 | 439 | 1486 | 3369 |
| 2070 | 463 | 0 | 567 | 0 | 0 | 446 | 0 | 0 | 182 | 482 | 2009 | 4149 |
| 2160 | 566 | 0 | 597 | 0 | 0 | 526 | 0 | 125 | 210 | 557 | 2704 | 5285 |
| 2250 | 623 | 0 | 622 | 0 | 0 | 593 | 0 | 158 | 239 | 657 | 3864 | 6756 |
| 2340 | 806 | 0 | 723 | 0 | 0 | 693 | 0 | 221 | 222 | 679 | 4525 | 7869 |
| 2430 | 776 | 0 | 744 | 0 | 0 | 695 | 0 | 223 | 212 | 680 | 4626 | 7956 |

The results reported in Table 2 are the headspace counts for various perfume raw materials having particular KI values in particles in which air was added to the precursor material. The particles 90 had the same composition by weight as the particles 90 above for which headspace data is presented in Table 1. The particles in which air was added to the precursor material had a porosity of 0.15, with the porosity being the ratio of the volume of voids in a particle to the total volume of the particle.

As shown in Table 2, headspace counts for three of the perfume raw materials were recorded at a time of zero. Further, at 90 seconds headspace counts were recorded for all but two of the perfume raw materials. At 90 seconds, the total head-space counts for the particles in which air was added to the precursor material was 11085, which is much larger than the head-space counts for the particles in which no air was added to the precursor material at any time up to 2430 seconds.

The conditions for the headspace testing described above are similar to the conditions that a consumer uses and experiences the scent of the particles 90 when she uses the particles 90 when she washes her clothes in a washing machine. The liquid filled tub of the washing machine is analogous to the distilled water and the air above the water is analogous to the air above the water in the washing machine. During use of the particles 90, perfume that escapes from the wash water blooms into the room in which the consumer washes her clothes allowing the consumer to experience a pleasant scent.

Based on the results shown in Tables 1 and 2, for nearly all perfume raw materials, the inclusion of air in the particles resulted in earlier detection of headspace counts and higher total head-space counts at any particular time. In general, headspace counts were detected about 21 minutes earlier for particles having inclusions of air as compared to particles formed without adding air to the precursor material. By analogy, it can be expected that the bloom of perfume into the room in which the consumer uses the particles 90 to launder her clothes will be faster for particles 90 having occlusions of air as compared to particles made without adding air to the precursor material.

Typical upright washing machines have cycle lengths between about 5 minutes to 20 minutes. Even at a time of 20 minutes, for particles made without adding air, no perfume was detected in the head-space. So, for a typical wash cycle, little to no perfume bloom into the head-space above the wash liquor and beyond the lid of the washing machine would be expected for particles made without adding air to the precursor material.

For particles to which air is added to the precursor material, perfume bloom into the head-space above the wash liquor and beyond the lid of the washing machine is

TABLE 2

Dissolving Head-Space Counts by KI value, measured every 90 seconds
for particles in which air was added to the precursor material.
Beads completely dissolved after 5 minutes (300 seconds).

| | KI value | | | | | | | | | | | Total headspace counts |
|---|---|---|---|---|---|---|---|---|---|---|---|---|
| Seconds | 1024 | 1062 | 1093 | 1160 | 1254 | 1293 | 1362 | 1379 | 1426 | 1481 | 1667 | |
| 0 | 125 | 0 | 0 | 0 | 0 | 108 | 0 | 0 | 0 | 0 | 367 | 600 |
| 90 | 2367 | 365 | 4240 | 860 | 113 | 1437 | 210 | 899 | 0 | 0 | 594 | 11085 |
| 180 | 2945 | 550 | 5491 | 1394 | 238 | 2176 | 359 | 1200 | 0 | 209 | 782 | 15344 |
| 270 | 4204 | 658 | 6699 | 1710 | 442 | 2537 | 575 | 1814 | 0 | 470 | 1704 | 20813 |
| 360 | 4558 | 372 | 4441 | 1230 | 567 | 2711 | 718 | 2110 | 0 | 584 | 2269 | 19560 |
| 450 | 4364 | 147 | 2895 | 737 | 612 | 2842 | 764 | 2179 | 0 | 784 | 3209 | 18533 |
| 540 | 3944 | 0 | 1922 | 474 | 511 | 2579 | 587 | 1705 | 0 | 695 | 2999 | 15416 |
| 630 | 3972 | 0 | 1806 | 399 | 565 | 2690 | 658 | 1769 | 0 | 783 | 3674 | 16316 | expected to occur within the first few minutes of the wash cycle. Perfume bloom into the laundry room can provide the consumer with a pleasant scent experience and potentially mask any deleterious odors associated with soiled laundry that is stored in the laundry room.

Without being bound by theory, it is thought that particles 90 having a density less than about 0.95 g/cm$^3$ tend to float in the water in the head-space above the wash liquor. This may allow perfume in the particles 90 to transfer directly to the head-space above the wash liquor from the particle 90 or only have to transport through a film or a small thickness of water to reach the head-space above the wash liquor. In contrast, particles having a density greater 1 g/cm$^3$ will tend to sink and the water resists transport of the perfume to the head-space above the wash liquor.

The particles 90 can have a Dissolving Head-Space Count greater than zero at about ninety seconds. The particles 90 can have a Dissolving Head-Space Count greater than zero at about one hundred eighty seconds. The particles 90 can have a Dissolving Head-Space Count greater than zero at about two hundred seventy seconds.

Optionally, the particles 90 can have a Dissolving Head-Space Count at about ninety seconds that is more than about ten percent of the of the Dissolving Head-Space Count at about 45 minutes. Optionally, the particles 90 can have a Dissolving Head-Space Count greater than zero at about ninety seconds and have a Dissolving Head-Space Count at about ninety seconds that is more than about ten percent of the of the Dissolving Head-Space Count at about 45 minutes. Optionally, the particles 90 can have a Dissolving Head-Space Count at ninety seconds that is more than about ten percent of the of the Dissolving Head-Space Count at 60 minutes. Optionally, the particles 90 can have a Dissolving Head-Space Count greater than zero at about ninety seconds and have a Dissolving Head-Space Count at about ninety seconds that is more than about ten percent of the of the Dissolving Head-Space Count at about 60 minutes.

The Dissolving Head-Space Count is a function of the quantity and type of perfume in the particle 90. More volatile perfumes in the particles 90 can be associated with a higher head-space count at a particular time. Similarly, a greater weight fraction of perfume in the particles 90 can be associated with a higher head-space count at a particular time. The volatility and weight fraction of perfume in the particles 90 can be tuned to provide for the desired head-space count at a particular time.

The shorter the amount of time it takes to reach a head-space count greater than zero the faster the bloom of perfumes from the particles 90 into the head-space above the wash liquor and the ambient air in the space around the wash basin. Non-zero head-space counts that occur within a short period of time, say for example, three to nine minutes, provide for particles 90 that have a noticeable perfume room bloom when used.

By having the Dissolving Head-Space Count greater than about 10% of the Dissolving Head-Space Count at some later time, the particles 90 can provide for an early perfume bloom that is strong in comparison to the perfumed bloom at a later time.

Particles 90 can be produced as follows. A 50 kg batch of precursor material 20 can be prepared in a mixer. Molten PEG8000 can be added to a jacketed mixer held at 70° C. and agitated with a pitch blade agitator at 125 rpm. Butylated hydroxytoluene can be added to the mixer at a level of 0.01% by weight of the precursor material 20. Dipropylene glycol can be added to the mixer at a level of 1.08% by weight of the precursor material 20. A water based slurry of perfume microcapsules can be added to the mixer at a level of 4.04% by weight of the precursor material 20. Unencapsulated perfume can be added to the mixer at a level of 7.50% by weight of the precursor material 20. Dye can be added to the mixer at a level of 0.0095% by weight of the precursor material 20. The PEG can account for 87.36% by weight of the precursor material 20. The precursor material 20 can be mixed for 30 minutes.

The precursor material 20 can be formed into particles 90 on a SANDVIK ROTOFORM 3000 having a 750 mm wide 10 m long belt. The cylinder 110 can have 2 mm diameter apertures 60 set at a 10 mm pitch in the cross machine direction CD and 9.35 mm pitch in the machine direction MD. The cylinder can be set at approximately 3 mm above the belt. The belt speed and rotational speed of the cylinder 110 can be set at 10 m/min.

After mixing the precursor material 20, the precursor material 20 can be pumped at a constant 3.1 kg/min rate from the mixer 10 through a plate and frame heat exchanger set to control the outlet temperature to 50° C.

Air or another gas can be entrained in the precursor material 20 at a level of about 0.5% to about 50% by volume. The precursor material 20 having air or another gas entrained therein can be passed through a Quadro Z1 mill with medium rotor/stator elements. After milling, the precursor material can optionally be passed through a Kenics 1.905 cm KMS 6 static mixer 50 installed 91.44 cm upstream of the stator 100.

DOWNY UNSTOPABLES in wash scent booster is presently marketed by The Procter & Gamble Company, Cincinnati, Ohio. The product is available in multiple scent variants. The product contains 86.6% to 89.3% by weight polyethylene glycol, 0.6% to 1.3% by weight perfume microcapsules, 4.9% to 9.4% by weight unencapsulated perfume, 1% to 4.3% by weight dipropylene glycol, 0.009% to 0.05% by weight dye, 1.5% by weight to 2.8% by weight deionized water and minors. The product particles typically have a density greater than 1.12 g/cm$^3$. The product particles typically have volume of occlusions of gas less than about 5% by volume of the particle. The occlusions of gas are thought to arise as a result of fracturing during cooling of the melt from which the particles are produced. The occlusions of gas have simple or complex asymmetrical or irregular shapes having curved contours, such as irregular circles, ellipses, crescents, pear shapes, and the like.

Table 3 lists formulations for particles 90 that could be made.

TABLE 3

Potential formulations for particles.

| % Wt | F1 | F2 | F3 | F4 | F5 | F6 |
| --- | --- | --- | --- | --- | --- | --- |
| PEG 8000 | 82.8 | 82.8 | 86.9 | 88.9 | 95.5 | 82.0 |
| BHT | 0.0135 | 0.0135 | 0.0173 | 0.0167 | — | 0.0213 |
| Perfume Microcapsule | 1.28 | 1.28 | 0.815 | 3.80 | 1.62 | — |
| Neat Perfume Oil | 6.65 | 6.65 | 5.80 | 3.84 | — | 8.58 |
| Dipropylene Glycol | 5.82 | 5.82 | 4.87 | 1.58 | — | 7.44 |
| Dye | 0.0203 | 0.0203 | 0.0304 | 0.0288 | 0.0252 | 0.0355 |
| Water and Minors | Balance | Balance | Balance | Balance | Balance | Balance |
| % Air by Volume of Particle | 0-5% | 15 | 21.5 | 30.5 | 5.5 | 44.9 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for forming particles comprising the steps of:
   providing a precursor material to a feed pipe;
   entraining occlusions of a gas into said precursor material;
   providing a stator in fluid communication with said feed pipe;
   distributing said precursor material to said stator;
   providing a cylinder rotating about said stator and rotatable about a longitudinal axis of said cylinder, wherein said cylinder has a periphery and a plurality of apertures disposed about said periphery;
   passing said precursor material through said apertures;
   providing a moveable conveyor beneath said cylinder;
   depositing said precursor material onto said moveable conveyor; and
   cooling said precursor material to form a plurality of particles.

2. The process according to claim 1, wherein said precursor material comprises polyethylene glycol having a weight average molecular weight from about 2000 to about 13000.

3. The process according to claim 2, wherein said precursor material comprises more than about 40% by weight polyethylene glycol.

4. The process according to claim 3, wherein said particles have an individual mass between about 0.1 mg to about 5 g.

5. The process according to claim 4, wherein said precursor material comprises from about 0.1% to about 20% by weight perfume.

6. The process according to claim 4 wherein said perfume comprises encapsulated perfume.

7. The process according to claim 6, wherein said precursor material comprises between about 0.1% and about 20% by weight encapsulated perfume.

8. The process according to claim 7, wherein said perfume comprises encapsulated perfume and unencapsulated perfume.

9. The process according to claim 1, wherein said precursor material is milled after said gas is entrained into said precursor material.

10. The process according to claim 1, wherein said gas is air.

11. The process according to claim 1, wherein said precursor material is provided to said feed pipe from a batch mixer.

12. The process according to claim 1, wherein said precursor material comprises an antioxidant.

13. A process for forming particles comprising the steps of:
   providing a precursor material in a batch mixer in fluid communication with a feed pipe;
   providing said precursor material to said feed pipe from said batch mixer;
   entraining occlusions of gas into said precursor material;
   providing a distributor comprising a plurality of apertures;
   transporting said precursor material from said feed pipe to said distributor;
   passing said precursor material through said apertures;
   providing a moveable conveyor beneath said apertures;
   depositing said precursor material onto said moveable conveyor; and
   cooling said precursor material to form a plurality of particles.

14. The process for forming particles according to claim 13, wherein said precursor material comprises polyethylene glycol having a weight average molecular weight from about 2000 to about 13000 and from about 0.1% to about 20% by weight perfume.

* * * * *